Sept. 15, 1964  S. P. RADELOFF ETAL  3,148,801
POURING SPOUT WITH COUNTING MEANS
Filed April 24, 1962  6 Sheets-Sheet 1
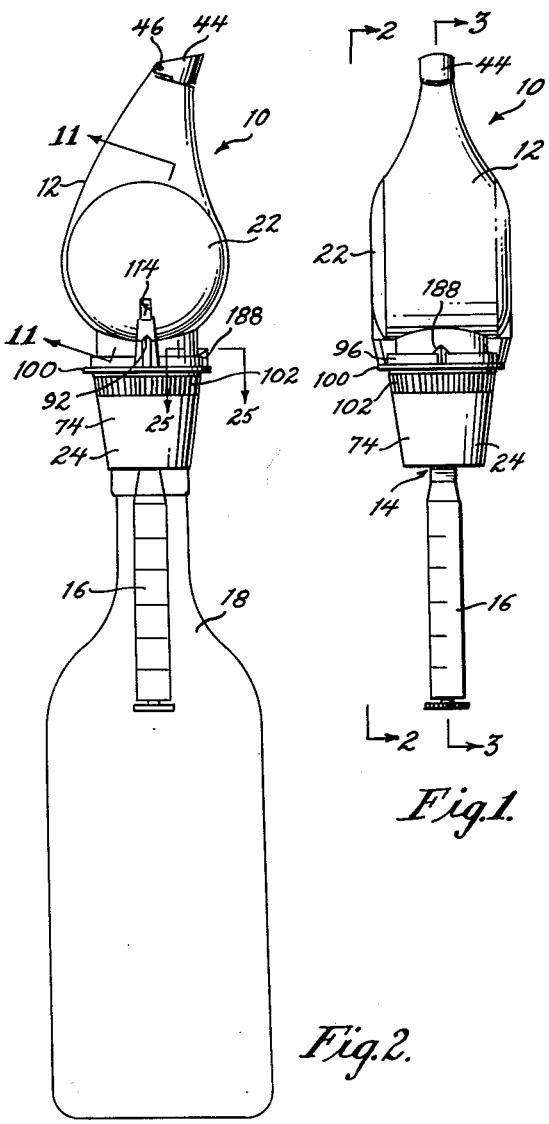
Fig.1.
Fig.2.
Fig.19.
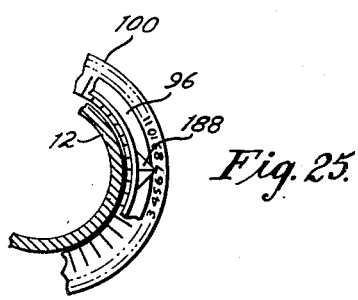
Fig.25.
INVENTORS.
SIDNEY P. RADELOFF
RAYMOND J. FALCONE
BY
ATTORNEY.

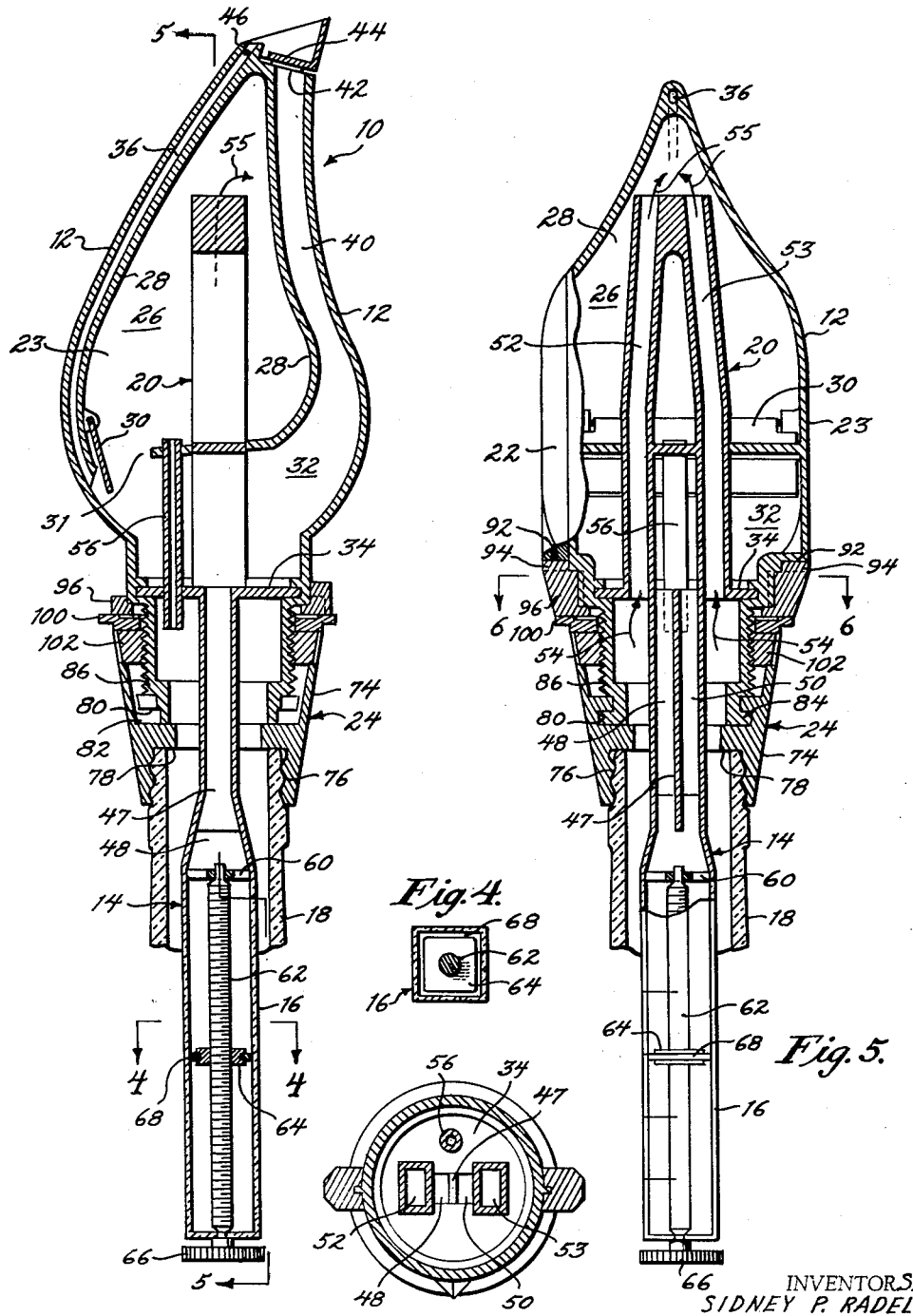

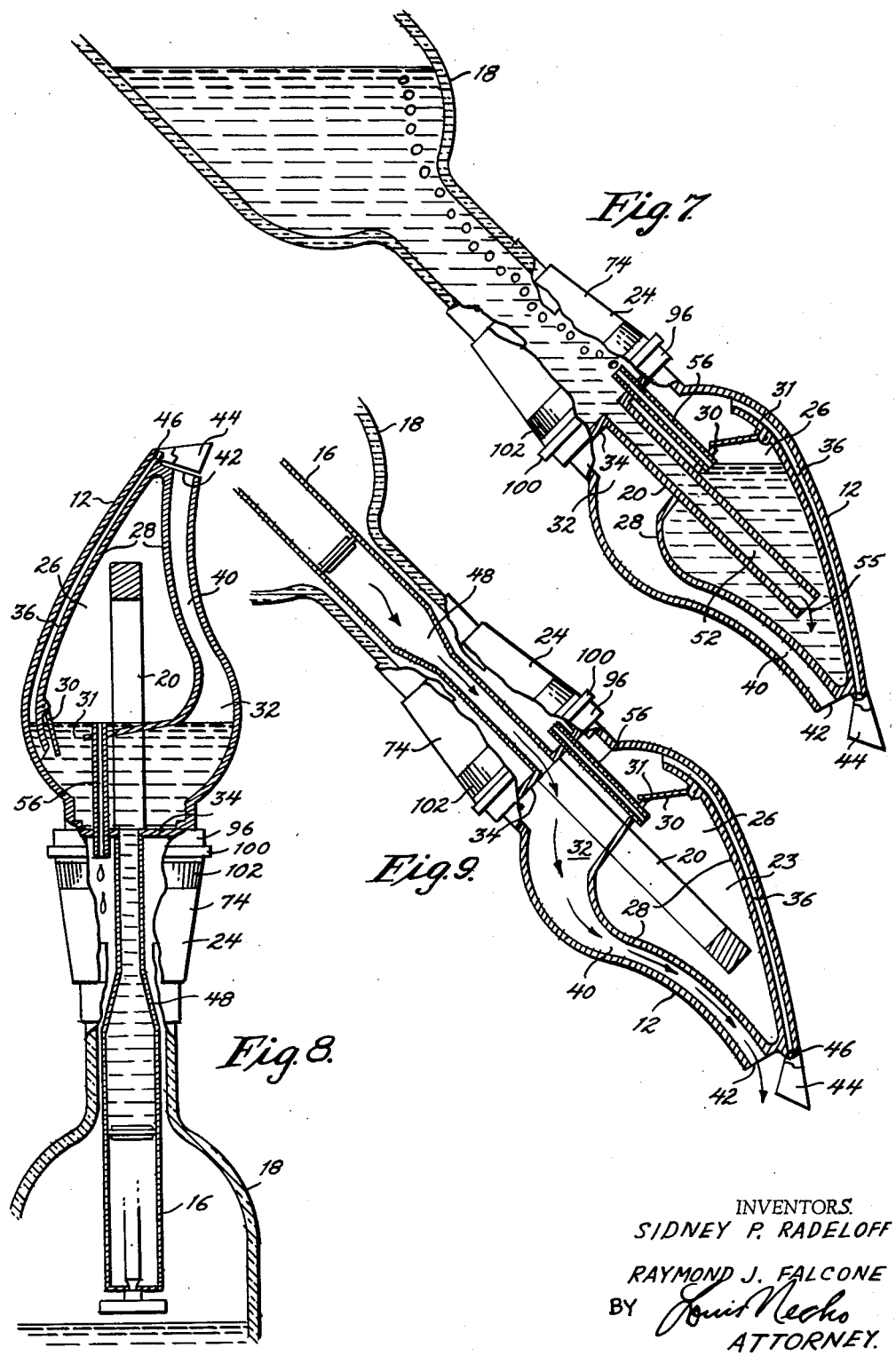

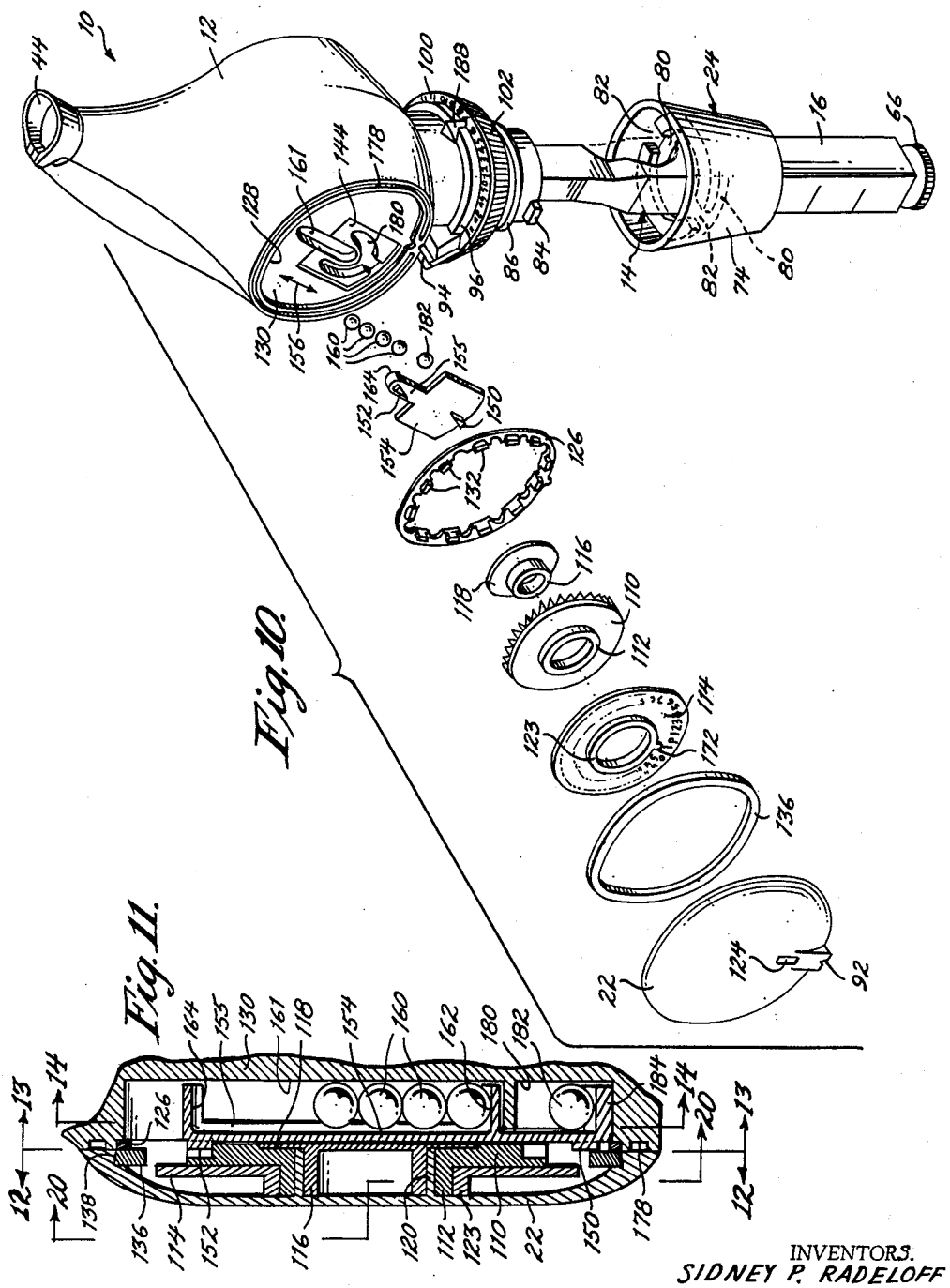

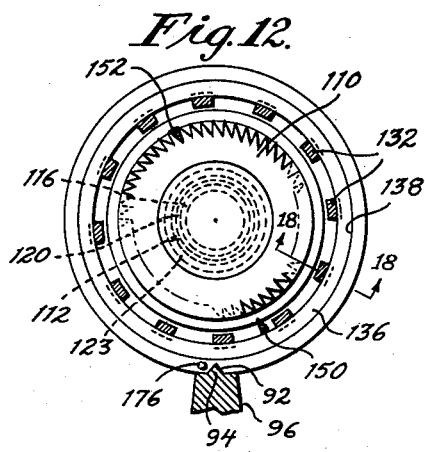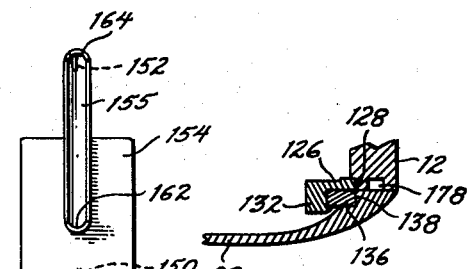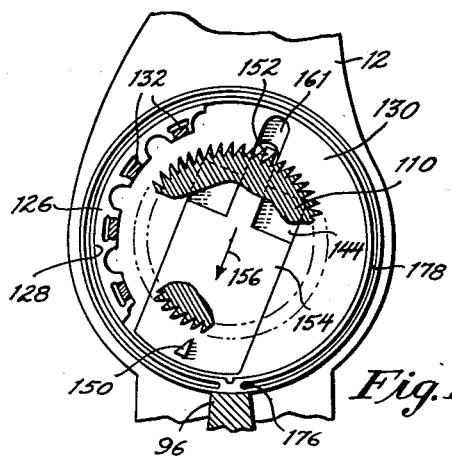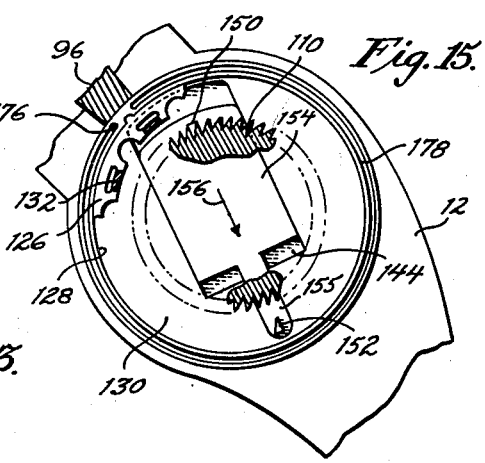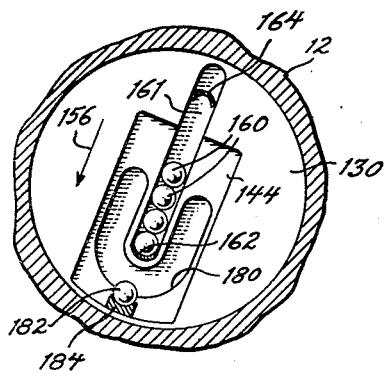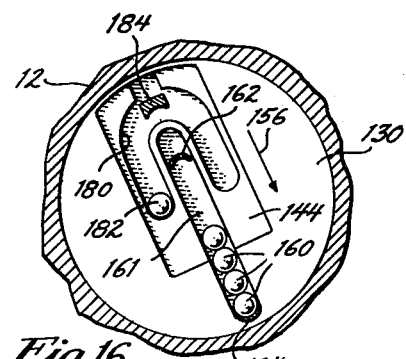
INVENTORS.
SIDNEY P. RADELOFF
RAYMOND J. FALCONE
BY Louis Necho
ATTORNEY.

Sept. 15, 1964 S. P. RADELOFF ETAL 3,148,801
POURING SPOUT WITH COUNTING MEANS
Filed April 24, 1962 6 Sheets-Sheet 6

INVENTORS.
SIDNEY P. RADELOFF
RAYMOND J. FALCONE
BY
ATTORNEY.

United States Patent Office 3,148,801
Patented Sept. 15, 1964

3,148,801
POURING SPOUT WITH COUNTING MEANS
Sidney P. Radeloff, 4912 Baltimore Ave., Philadelphia, Pa., and Raymond J. Falcone, deceased, late of Philadelphia, Pa., by Edward F. Falcone, administrator, 7905 Leonard St., Philadelphia, Pa.
Filed Apr. 24, 1962, Ser. No. 189,929
4 Claims. (Cl. 222—38)

This invention relates to a dispensing spout of the type shown in U.S. Patent No. 2,664,226.

One object of the invention is to produce an improved measuring and pouring spout of the type set forth.

A further object of the invention is to produce an improved measuring and pouring spout which is easily attachable to a bottle, or other receptacle, which is durable, reliable and fool-proof, and which is operable to dispense successive, measured quantities of a liquid or of a finely pulverized non-sticky and non-hygroscopic material by merely tipping the bottle, or other container to which the spout is attached, to a substantially upside-down position.

A still further object of the invention is to produce an improved spout of the type set forth which is readily adjustable whereby the amount of material dispensed may, by each tipping of the bottle, be varied.

A still further object is to produce a measuring and pouring spout which includes a counting mechanism operable to count the number of times the spout is tilted to pouring position and righted without reference to the amount of material dispensed by each tilting of the bottle.

While a spout embodying this invention has more than one application, it will, in the following specification, be described as applied to a bottle containing a liquid.

The full nature of the invention will be understood from the following specification and the accompanying drawings in which:

FIG. 1 is a front elevation of a dispensing spout embodying the invention shown detached.

FIG. 2 is a side elevation looking in the direction of line 2—2 on FIG. 1 and showing the dispensing spout affixed to a bottle.

FIG. 3 is an enlarged sectional view looking in the direction of line 3—3 on FIG. 2, but showing the spout affixed to the mouth of the bottle.

FIG. 4 is a sectional view looking in the direction of line 4—4 on FIG. 3.

FIG. 5 is a sectional view looking in the direction of line 5—5 on FIG. 3.

FIG. 6 is a sectional view looking in the direction of line 6—6 on FIG. 5.

FIG. 7 is an enlarged, fragmentary, sectional view showing the manner in which the spout must be tilted when first affixed to a freshly opened bottle and before any liquid has been dispensed.

FIG. 8 is similar to FIG. 7, but shows the spout and bottle moved to the upright position which is necessary before any liquid can be dispensed.

FIG. 9 is similar to FIGS. 7 and 8, but shows the spout and bottle in the position of pouring a first measured quantity of liquid.

FIG. 10 is an exploded perspective view showing details of the counting mechanism associated with the dispensing spout.

FIG. 11 is a sectional view looking in the direction of line 11—11 on FIG. 2.

FIG. 12 is a sectional view looking in the direction of line 12—12 on FIG. 11.

FIG. 13 is a sectional view looking in the direction of line 13—13 on FIG. 11, showing some of the parts in the position they assume when the spout is right-side up.

FIG. 14 is a sectional view looking in the direction of line 14—14 on FIG. 11, but with some parts removed to show details of structure.

FIGS. 15 and 16 are similar to FIGS. 13 and 14, respectively, but showing the position of the parts when the spout is inverted.

FIG. 17 is an elevational view of a slide which forms part of the counting mechanism actuating means which is also shown in FIGS. 13 and 15.

FIG. 18 is an enlarged, fragmentary, sectional view in the direction of line 18—18 on FIG. 12 and showing details of construction.

FIG. 19 is a greatly enlarged view, partly in elevation and partly in section, showing details of the counting mechanism actuating means.

FIG. 25 is an enlarged, fragmentary, sectional view looking in the direction of line 25—25 on FIG. 2 and shows details of construction.

Figure 20:
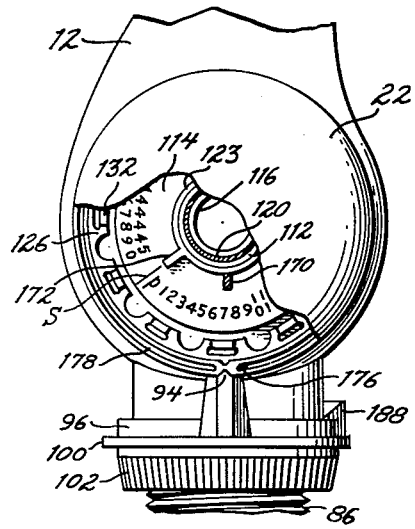
FIG. 20 is an enlarged, fragmentary elevation of the spout as viewed in FIG. 1, some parts being broken away to show details of the counting mechanism.

In general, a spout embodying the invention conveniently comprises a housing, a first compartment formed within said housing and adapted to receive liquid by gravity when the bottle is inverted; means for venting said first compartment; a second compartment adapted to receive liquid, by gravity, from said first compartment; a dispensing passageway leading from the second compartment to the exterior of the housing; and a counting mechanism incorporated in the spout for counting the number of times the spout is inverted and returned to its upright position to indicate the number of units of material dispensed through said spout.

As best shown in FIGS. 2 and 3, a pouring spout 10 of this invention includes casing 12 and a tubular extension 14, the lower part 16 of which is insertable into a bottle 18, and the upper portion 20 of which is permanently disposed within the casing 12. Casing 12 also encloses a counting mechanism which is shown in FIGS. 10 to 25, but which, in FIGS. 1 and 2, is concealed by cover 22. The pouring spout is detachably secured to the neck of bottle 18 by a coupling 24. The structure of the counting mechanism and of coupling 24 will be hereinafter more fully set forth.

To form the spout of this invention, and as shown in FIGS. 3 and 5, the interior of casing 12 is divided to provide a first compartment 26 which is defined by wall 28 and a hinged door 30 which, in the inverted position of the spout, as in FIGS. 7, 8 and 9, closes passage 31 to provide a second compartment 32 which is defined by the wall of casing 12, by wall 28, and a partition 34. One portion of wall 28 of compartment 26 co-acts with the adjacent portion of casing 12 to form an air vent 36, which leads from compartment 32 to the atmosphere, and another portion of wall 28 of said compartment co-acts with the adjacent portion of casing 12 to form a liquid passage 40 which leads from compartment 32 to discharge opening 42. It will be seen from FIGS. 3 and 9 that, when the pouring spout is in the upright position, discharge opening 42 is closed by cap 44 which is hinged at 46 and that, when the pouring spout is turned upside-down, or to the pouring position, cap 44 moves out of the way by gravity. It will also be noted that, in neither of its positions, does cap 44 obstruct air vent 36.

The lower portion 16 of tubular extension 14 is divided by partition 47 into two storage compartments 48 and 50, the upper open ends of which communicate with compartment 32. The upper portion 20 of tubular extension 14 is preferably formed of two tubes 52 and 53, the lower ends of which straddle the upper open ends of compartments 48 and 50, FIG. 6, and communicate, through partition 34, with the interior of the bottle, as shown by arrows 54 in FIG. 5. The upper ends of tubes 52 and 53 lead into compartment 26 as shown by arrows 55 in FIG. 5. A liquid level control tube 56 connects compartment 26 with the interior of the bottle for a purpose hereinafter explained.

Below partition 47 is a fixed spider 60 which forms a bearing for the unthreaded end of screw 62 which threadedly engages square follower 64. The other end of screw 62 is provided with a knurled operating knob 66 which, when turned, causes follower 64 to move up, or down, on screw 62 so as to vary the volumetric capacity of tubular extension 16 above the follower which is provided with gasket 68.

The operation of the parts thus far described is clearly illustrated in FIGS. 7, 8 and 9 and is as follows:

When the spout is affixed to a freshly opened bottle with the bottle in its right-side up position, compartments 26 and 32 and tubular extension 16 will all be empty. Tilting the bottle and the spout, for the first time, as shown in FIG. 7, causes some of the contents of the bottle to flow through tubes 52 and 53 into compartment 26, as shown by arrows 55. It will be noted that, as liquid enters compartment 26, the air originally in this compartment is vented into the bottle through tube 56, as diagrammatically exemplified by the bubbles shown in FIG. 7. When the liquid level in compartment 26 rises far enough, as viewed in FIG. 7, to seal the end of tube 56, the flow of liquid into compartment 26 ceases.

When the bottle is righted, as shown in FIG. 8, liquid flows through opening 31, from compartment 26 to compartment 32 and into compartments 48 and 50. Liquid also flows back into the bottle through tube 56, as diagrammatically exemplified by the drops shown in FIG. 8, until the level of the liquid in compartment 26 is flush with the end of tube 56. To dispense the liquid stored in storage compartments 48 and 50, and in compartment 32, the bottle is again tilted to allow the liquid to flow out through discharge opening 42, as shown by the arrows in FIG. 9. Simultaneously with the emptying of compartment 32 and compartments 48 and 50, liquid again flows from the bottle into compartment 26 through tubes 52 and 53, in the manner previously described to recharge compartment 26, and so on. In other words, after the first tilting and righting of the bottle, all subsequent tiltings and rightings will pour out a measured quantity and will charge the spout with an equal quantity.

It will be evident that, the higher the upper end of tube 56 is above passage 31 (as viewed in FIG. 8), the sooner it will be sealed by the liquid rising in compartment 26 (as viewed in FIG. 7) and the smaller the quantity of liquid delivered to compartment 26, and ultimately poured out. Obviously, under no circumstances may the upper end of tube 56 (as viewed in FIG. 8) be lower than passage 31.

Likewise, by enlarging or reducing the capacity of storage compartments 48 and 50, the amount of liquid stored and ultimately poured out can be varied without changing the spout structure in any way.

When used by an honest right-handed person, the spout presents no problem. But, when it is used by a left-handed person, or by a dishonest right-handed person, and in the absence of door 30, the bottle can be tilted to a position in which the liquid in compartment 26 can assume a position in which the end of the tube 56 in compartment 26 is exposed and therefore, by jiggling the bottle while the bottle is in this tilted position, it becomes possible to transfer liquid from the bottle into compartment 26 through tubes 52 and 53 and from compartment 26, through opening 31, into compartment 32 and thus serve a larger quantity of liquid. But, with door 30 closing opening 31 as long as the bottle is tilted to approximate pouring position, no additional liquid can be transferred to compartment 32. It will be remembered that as the bottle is righted, the liquid sloshed into compartment 26 flows back into the bottle through tube 56.

It will be seen from the foregoing that by the provision of storage compartments 48 and 50 and means 62, 64 and 68 for adjusting the storing capacity of these tubes, the size of the drink served from various bottles can be varied while using the same spout on all bottles. For example; if with the adjustment shown in FIGS. 3 and 5 one ounce drinks will be dispensed, a larger quantity will be dispensed moving member 64 downwardly to enlarge the capacity of passages 48 and 50. This will be done before the spout is applied to the bottle and therefore two identically seeming bottles can dispense different size drinks. Also, the provision of door 30 which closes opening 31 when the bottle is tilted enough for liquid in compartment 32 to flow out, prevents increasing the size of drinks by sloshing the liquid in the bottle as above set forth.

Coupling 24 includes a frusto-conical body 74 which threadedly engages the mouth of the bottle, as at 76, the arrangement being such, that when coupling body 74 is threaded home, the upper edge of the bottle neck will abut internal flange 78 to seal the mouth of the bottle and to limit the axial movement of coupling 24 relative to the bottle. Coupling body 74 is connected to the spout by means of an internal groove 80 which is provided with opposed openings 82 for receiving opposed lugs 84, FIG. 5, which are carried by the exterior of a collar 86 which is fastened to, or forms part of, casing 12. It will be apparent that groove 80 and lugs 84 cooperate to form a bayonet coupling whereby, if lugs 84 are inserted through openings 82 and if the spout is rotated relative to coupling 24, lugs 84 will enter groove 80 and will prevent axial movement of the spout relative to coupling 24 and, hence, relative to the bottle to which body portion 74 of the bottle is threaded, as at 76. To retain the parts in the assembled position above described and to prevent movement of the spout relative to coupling 24 and to the bottle, we provide cover 22 and the opposite side wall 23 of casing 12 with inverted V-shaped slots 92 for engagement with wedges 94 which are carried by a retaining ring 96, FIGS. 2 and 21 to 24.

It will be noted that, with wedges 94 engaged with slots 92, the spout will be integrated with ring 96. Collar 96 is tightly clamped against the underside of casing 12 by a lock nut 102 which threadedly engages collar 86. Between collar 96 and lock nut 102 is a flat ring 100 which is hereinafter referred to. The operation of the parts above described is as follows:

Retaining ring 96 is first placed in position with wedges 94 engaging inverted V-slots 92; ring 100 is placed against the underside of ring 96 and lock nut 102 is threaded, as far as it will go, on collar 86. With nut 102 clamping wedges 94 in engagement with slots 92, and with lugs 84 engaging groove 80, coupling 24 is threaded onto the neck of the bottle to affix the spout to the bottle. Any suitable means for preventing disengagement of the coupling from the bottle, such as a seal which is used to prevent tampering with electric and water meters, can be used. It will be noted that, when coupling 24 is unthreaded from the bottle, the spout remains completely assembled. It will also be noted that the parts which come in contact with the material dispensed are easily cleaned by swishing the bottle in a suitable solvent.

For use in connection with bottles, the necks of which are not threaded, a stopper which is wedged in the mouth of the bottle, or some other adapter may be used. Since this is well within the ken of those skilled in the art, it is thought that no detailed drawing or description is needed.

Figure 22:
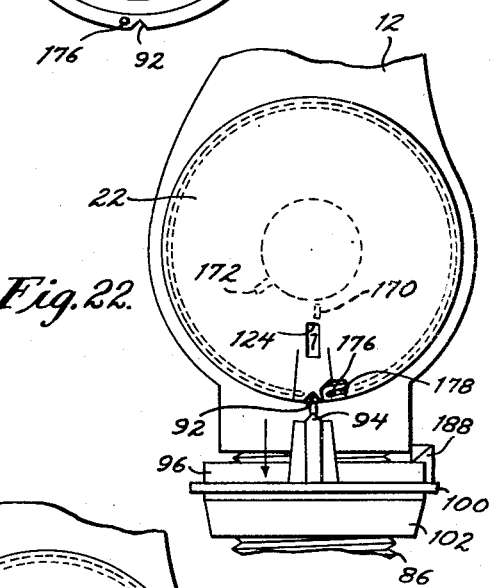
FIGS. 22, 23 and 24 are partial side elevational views showing how the counting mechanism is reset.
Figure 23:
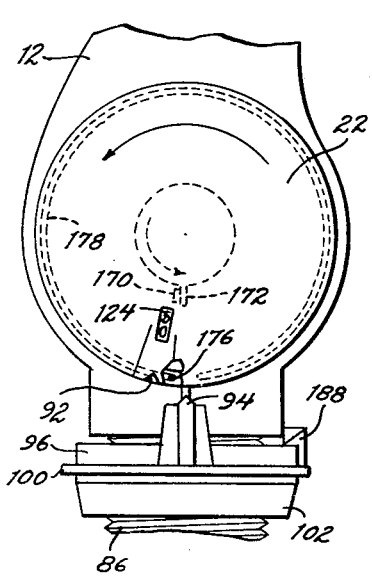
Figure 24:
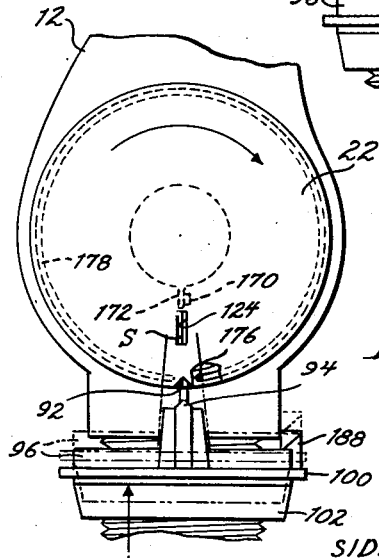

As best shown in FIG. 10, the counting mechanism proper includes a gear 110 having a hub 112 which carries a disc 114 bearing consecutive numbers, such as from 1 to 50. Gear 110 and numeral bearing disc 114 are, in turn, carried on the hub 116 of a centering member and are secured to cover 22 by engaging hub 116 of the centering member 118 with a hub 120 formed on the inside of cover 22, as clearly shown in FIG. 11. Numeral bearing disc 114 is spaced from the adjacent face of the cover by a hub or collar 123. Cover 22 is provided with a window 124 through which the numerals on disc 114 can be seen, as shown in FIGS. 22 and 23. Cover 22, carrying disc 114, gear 110 and centering member 118, is secured to casing 12 by a snap-on action which is achieved by means of a locking ring 126, the periphery of which snaps into engagement with groove 128 formed around wall 130 of casing 12. The face of locking ring 126 which faces cover 22 is provided with lugs 132 which are adapted tightly to engage the interior of retaining ring 136, the exterior of which snaps into groove 138 formed at the periphery of the face of cover 22, which faces casing 12, as viewed in FIGS. 10 and 11. At least rings 126 and 136 are made of a slightly resilient material so that, when ring 126 is snapped into groove 128, and when ring 136 is snapped into groove 138 and then snapped over projection 132, cover 22 will be firmly, but detachably, secured to casing 12.

Gear 110 is rotated by the alternate engagement with opposite teeth thereof of wedge-shaped teeth 150 and 152 on the face of slide 154 which has an arm extension 155 and is freely reciprocable over surface 144 in the direction of arrow 156 in FIGS. 10 to 16. It will be noted that wall 144 is recessed inwardly, or to the right of wall 130, as viewed in FIG. 10. Slide 154 is reciprocated over surface 144 by means of balls, or other weights, 160, freely movable in slot 161 and confined between curvilinear fingers 162 and 164 which project from the face of arm 155 facing wall 144 and which are also freely movable in slot 161, FIGS. 11 and 16. It will be noted that the axis of movement of slide 154 (arrow 156) is at an angle to the vertical diameter of gear 110.

The operation of the gear rotating mechanism is as follows:

When the bottle is right-side up, balls 160 come to rest on finger 162 and move slide 154 downwardly, or to the position of FIGS. 11 and 14. This movement of slide 154 brings tooth 152 into oblique engagement with the tooth of gear 110 which happens to register with it, as shown in FIG. 19, thus rotating the gear. When the bottle is tipped to the position of FIG. 9, balls 160 run downwardly, as viewed in FIG. 16, and come to reset on finger 164, thus moving slide 154 in the same direction and causing tooth 150 obliquely to engage the corresponding tooth on gear 110 further to turn the gear. It will be understood that the pitch of the gear teeth, the pitch of teeth 150 and 152, and the angular relation between the axis of movement of slide 154 and the vertical diameter of gear 110 are such that it takes a tilting and a righting of the spout to rotate gear 110 through one tooth. As gear 110 rotates, the numerals on disc 114 come into successive registration with window 124 in cover 22, FIGS. 10 and 22.

It will be remembered that, according to this invention, the bottle must be tipped to the position of FIG. 7 and back to the position of FIG. 8 before the first quantity of liquid can be dispensed, and it is therefore necessary to discount the first tipping and righting of the bottle so that numeral "1" on disc 114 will show only when the first quantity of liquid has actually been poured. According to this invention, this is accomplished by providing, in advance of numeral "1," two symbols, such as a stroke "S" followed by letter "P," FIG. 20, so that, when a freshly opened bottle is first tipped to the position of FIG. 7, stroke "S" will be visible through window 124 and when the bottle is righted, as shown in FIG. 8, letter "P" will be visible to indicate that the spout has been charged and is ready to pour the first drink or unit.

Figure 21:
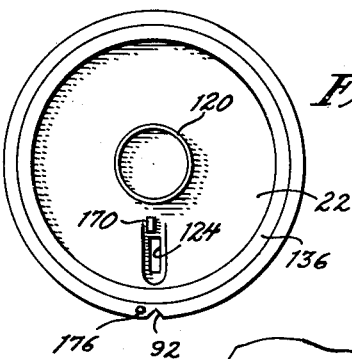
FIG. 21 is an elevation of the obverse side of the cover which is shown partly broken away in FIG. 20.

To reset the counting mechanism, the side of cover 22 which faces numeral bearing disc 114 is provided with a lug 170 which, as shown in FIG. 21, is immediately above and to the left of window 124, and the side of disc 114 which faces cover 22 is provided with a similar lug 172. Lug 170 is in the path of movement of lug 172 so that, when gear 110 has completed one turn, lug 172 will abut the right-hand edge of lug 170, as viewed in FIG. 20. Since the cover is fixed, abutment of lug 172 against lug 170 limits the movement of disc 114 in ascending numeral direction. To return disc 114 to zero, lock nut 102 is backed off enough to permit disengagement of wedges 94 from slots 92 and cover 22 is manually rotated in the opposite direction (counter-clockwise, as viewed in FIG. 20) to engage lug 170 with lug 172 and turn disc 114 back to the starting position in which stroke "S" and letter "P" are back at the starting position above described and the counting mechanism is ready to begin another cycle.

It will be noted that the resetting operation can be carried out at any time before, or after, the bottle has been completely emptied and before, or after, gear 110 has made a full turn. After disc 114 has been re-set, the cover is turned in the opposite direction to bring window 124 into registration with the stroke preceding letter "P" on disc 114. It will be noted that, when the cover is moved in clockwise direction in FIG. 23, lug 172 moves away from lug 170 and disc 114 will not move in ascending numerical order.

In order to limit the movement of cover 22 in disc-rotating direction to the exact extent needed to turn disc 114 back to "Zero," or starting position, cover 22 is provided with a pin 176 which, when the cover is applied to the casing, as in FIGS. 1 and 11, engages a circular channel 178 formed in wall 130 just outside of groove 128, FIGS. 10 and 20. Pin 176 is so disposed that, when disc 114 is in zero, or cycle-starting position, pin 176 will be in the position of FIG. 24, or the right-hand end of channel 178, as viewed in FIG. 24, and when the cover has been turned in disc 114 resetting direction, the movement of the cover and the disc will stop when pin 176 reaches the right-hand end of channel 178, as shown in FIG. 20.

In order to prevent rotation of gear 110 and disc 114 by jiggling the bottle up and down, as viewed in FIG. 10, without tilting the bottle to pouring position, a U-shaped slot 180 is provided in wall 130 immediately adjacent one end of slot 161, FIGS. 10 and 14. Slot 180 is large enough for free movement therein of a ball 182, and of a finger 184 which projects from the adjacent face of slide 154, FIGS. 10 and 17. In assembling the parts, ball 182 is deposited in slot 180 in such a manner that, when the parts are in the position of FIGS. 11 and 14, ball 182 comes to rest on finger 184. In this position, ball 182 prevents upward movement of slide 154, as viewed in FIGS. 10 and 14, and therefore it prevents tooth 150 from engaging and rotating gear 110. When the bottle is tipped over, ball 184 runs down slot 180, as shown in FIG. 16, and slide 154 is free to move downwardly, as viewed in FIGS. 15 and 16, to engage tooth 150 with the gear 110 to turn the latter as above explained.

The spout of this invention can also be provided with means for storing information as to the total number of bottles used up, or the total number of liquid units dispensed. This is achieved by inserting a flat ring 186 between locking nut 102 and retaining ring 96 and by providing the upper face of said ring, as viewed in FIGS. 10 and 25, with numerals which are adapted to register with a suitable index 188 on ring 96. Ring 186 is rotatable, even when nut 102 is threaded tight enough to engage wedges 94 with slot 92 as above explained. Therefore, when a bottle is used up, ring 100 is turned to bring numeral 1 into registration with index 188, and so on, for each bottle used. Instead, the numerals on ring 100 can be used to record the total number of units dispensed, such as 49 units from one bottle, or 60 from another, depending on the size of the units dispensed and/or on the size of the bottle.

In the "higher class" establishment, a bottle is placed at the table of a customer who is expected to report to the waiter the number of drinks poured out. It is well known that, after a few drinks, some people can miscount and that some people can miscount without the aid of the suppressive effect of alcohol. For such cases, the waiter turns numeral bearing ring until the number on this ring, which registers with window 124, comes into registration with index 188. The coinciding numbers are shown to the customer and when the bottle is returned, the customer is charged for the number found after subtracting the number registering with index 188 from the number showing through window 124.

What we claim is:

1. A measuring and dispensing spout for use in dispensing measured quantities of liquid from a bottle, said spout including:
   a casing attachable to the mouth of said bottle,
   means dividing said casing into a first, liquid receiving compartment and a second liquid discharging compartment,
   means connecting said first compartment in flow relation to the interior of the bottle whereby when said bottle is tilted toward inverted position liquid will flow from the bottle into said first compartment,
   a variable volumetric capacity storage compartment connected in flow relation to said second compartment,
   a passage connecting said first compartment in flow relation to said second compartment and said storage compartment,
   said second compartment and said storage compartment, being below said first compartment and said passage being in lower position of said first compartment in the right end up position of the bottle, whereby, when said bottle is in right end up position, liquid will flow from said first compartment into said second compartment and into said storage compartment,
   control means independent of the dimensions of said first compartment for limiting the amount of liquid which can flow into said first compartment on inversion of the bottle,
   and a discharge outlet leading from the top of said second compartment for discharging the liquid in said second compartment and from said storage compartment on inversion of the bottle.

2. The structure recited in claim 1 and a vent independent of said discharge outlet and leading from said second compartment to atmosphere.

3. The article of claim 1 including gravity-actuated counter means located adjacent the compartments in the housing and responsive to the movement of the spout to, and from, the inverted and upright positions.

4. A measuring and dispensing spout for use in dispensing measured quantities of liquid from a bottle, said spout including:
   a casing attachable to the mouth of said bottle,
   means dividing said casing into a first liquid receiving compartment and second liquid discharging compartment,
   means connecting said first compartment in flow relation to the interior of the bottle whereby when said bottle is tilted toward inverted position liquid will flow from said bottle into said first compartment,
   a passage connecting said first compartment in flow relation to said second compartment, said second compartment being below said first compartment and said passage being in the lower portion of said first compartment whereby when said bottle is in right end up position liquid will flow from said first compartment into said second compartment, and
   a door for closing said passage as long as said bottle is tilted enough for liquid to flow into said first compartment.

References Cited in the file of this patent

UNITED STATES PATENTS

| | | |
|---|---|---|
| 272,072 | Michaelis | Feb. 13, 1883 |
| 396,021 | Barker | Jan. 8, 1889 |
| 527,726 | Schneider et al. | Oct. 16, 1894 |
| 697,830 | Franc | Apr. 15, 1902 |
| 1,009,550 | Moys et al. | Nov. 21, 1911 |
| 1,198,900 | Eggert | Sept. 19, 1916 |
| 1,256,298 | Cremona | Feb. 12, 1918 |
| 1,687,705 | Androff | Oct. 16, 1928 |
| 1,957,962 | Hyatt | May 8, 1934 |
| 2,150,082 | Sprunger | Mar. 7, 1939 |
| 2,352,809 | Strauss | July 4, 1944 |
| 2,400,328 | Zehring | May 14, 1946 |
| 2,415,257 | McGreal | Feb. 4, 1947 |
| 2,584,130 | Huebl et al. | Feb. 5, 1952 |
| 2,600,604 | Atherton | June 17, 1952 |
| 2,634,055 | Thompson | Apr. 7, 1953 |
| 2,661,867 | Christeck | Dec. 8, 1953 |
| 2,721,005 | Lesnick | Oct. 18, 1955 |
| 2,883,086 | Davison et al. | Apr. 21, 1959 |

FOREIGN PATENTS

| | | |
|---|---|---|
| 102,447 | Australia | Nov. 18, 1937 |
| 106,367 | Sweden | Jan. 19, 1943 |
| 613,304 | Great Britain | Nov. 24, 1948 |
| 741,676 | Germany | Nov. 15, 1943 |